(12) United States Patent
Geller (10) Patent No.: US 8,683,663 B2
(45) Date of Patent: Apr. 1, 2014

(54) DEVICE FOR DETACHABLY FASTENING A CAMERA TO A CARRYING STRAP

(76) Inventor: Wolfgang-Peter Geller, Garlstorf (DE)

( * ) Notice: Subject to any disclaimer, the term of this patent is extended or adjusted under 35 U.S.C. 154(b) by 0 days.

(21) Appl. No.: 13/391,065

(22) PCT Filed: Aug. 20, 2010

(86) PCT No.: PCT/EP2010/062157
§ 371 (c)(1),
(2), (4) Date: Mar. 20, 2012

(87) PCT Pub. No.: WO2011/023633
PCT Pub. Date: Mar. 3, 2011

(65) Prior Publication Data
US 2012/0167353 A1    Jul. 5, 2012

(30) Foreign Application Priority Data

Aug. 25, 2009 (DE) .................... 20 2009 011 442 U
Aug. 25, 2009 (DE) .................... 20 2009 011 443 U (51) Int. Cl.
*A44B 13/00* (2006.01)
*A45F 5/00* (2006.01)
*G03B 17/56* (2006.01)

(52) U.S. Cl.
USPC .......... 24/302; 24/265 AL; 24/3.13; 396/423; 224/908

(58) Field of Classification Search
USPC ........... 224/254–256, 908, 257, 150; 24/3.12, 24/3.13, 298–302, 363–366, 370, 376, 24/693, 265 AL, 197; 396/419, 420, 422, 396/423, 428; 42/85
See application file for complete search history.

(56) References Cited

U.S. PATENT DOCUMENTS

| | | | | |
|---|---|---|---|---|
| 380,990 A * | 4/1888 | Carter et al. | .............. | 24/598.5 |
| 1,449,978 A * | 3/1923 | Fordyce | .............. | 24/580.1 |
| 1,766,090 A * | 6/1930 | Worsching | .............. | 396/421 |
| 2,130,262 A * | 9/1938 | Burlin | .............. | 294/139 |
| 2,190,268 A * | 2/1940 | Magid | .............. | 59/95 |
| 2,480,662 A * | 8/1949 | McKinzie | .............. | 42/85 |
| 2,589,913 A * | 3/1952 | Wenner | .............. | 114/294 |
| 2,642,689 A * | 6/1953 | Cline | .............. | 42/85 |
| 2,758,440 A * | 8/1956 | Magid | .............. | 59/95 |
| 3,305,148 A | 2/1967 | Zimmerman | | |
| 3,938,166 A * | 2/1976 | Sloop | .............. | 396/423 |
| 4,058,242 A * | 11/1977 | Brewer | .............. | 224/606 |

(Continued)

FOREIGN PATENT DOCUMENTS

| JP | 2004-320695 | 11/2004 |
|---|---|---|
| JP | 2005-065805 | 3/2005 |
| WO | 2008/131135 | 10/2008 |

*Primary Examiner* — Victor Batson
*Assistant Examiner* — Abigail Morrell
(74) *Attorney, Agent, or Firm* — Sand & Sebolt (57) ABSTRACT

The invention relates to a device for detachably fastening a camera to a carrying strap. The device for detachably fastening a camera to a carrying strap includes an eyelet piece comprising an eyelet, a flexible extension fixed to the eyelet piece, and a fastening element designed as a stand screw for securing to the camera, said element being disposed on an end of the flexible extension facing away from the eyelet piece. The special feature of the eyelet of the eyelet piece is that it has an opening in the peripheral rim thereof, through which a carrying strap, in particular a carrying strap that is part of another system, such as the carrying strap of a handbag or camera bag, can be threaded.

22 Claims, 6 Drawing Sheets

(56) References Cited

U.S. PATENT DOCUMENTS

| | | | |
|---|---|---|---|
| 4,155,636 A * | 5/1979 | Reeberg | 396/423 |
| 4,266,867 A * | 5/1981 | Reeberg | 396/423 |
| 4,328,917 A | 5/1982 | Reeberg | |
| 5,692,654 A * | 12/1997 | Bell | 224/150 |
| 5,738,328 A * | 4/1998 | O'Farrill | 248/500 |
| 7,654,027 B1 * | 2/2010 | Grover | 42/85 |

* cited by examiner

DEVICE FOR DETACHABLY FASTENING A CAMERA TO A CARRYING STRAP

CROSS REFERENCE TO RELATED APPLICATIONS

This application is a National Stage Entry of PCT Application Ser. No. PCT/EP2010/062157 having an international application date of Aug. 20, 2010, which application claims priority from German Patent Application No. 20 2009 011443.0, filed Aug. 25, 2009.

FIELD OF THE ART

The invention relates to a device for detachably fastening a camera to a carrying strap, preferably a carrying strap that is carried crossways over the shoulder.

PRIOR ART

It is known that cameras, such as photographic cameras as well as film cameras, are carried by a carrying strap. There exist two principal carrying options: on the one hand, a neck carrying strap that is arranged around the throat and neck of the wearer and attached to which the wearer carries the camera in front of his/her chest area; also known, on the other hand, are systems that provide for routing the carrying strap over the shoulder, and wherein the camera that is carried on the strap is suspended laterally of the wearer's body. The first-named straps and/or carrying systems are not preferred especially for heavy cameras because the weight of the camera places stress on the wearer's sensitive neck area and may cause neck pain.

Specifically WO 2008/131135 A1 discloses a camera carrying strap that is arranged crossways over the shoulder and includes a screw adapter that is to be screwed into the stand screw bushing on the camera; said screw adapter is routed via an eyelet in the longitudinal direction of the carrying strap. This carrying strap has the advantage that the camera carried thereon can, on the one hand, be carried comfortably along the side of the wearer's body, and wherein the weight of the camera is supported by the more stable load-carrying shoulder area and not the neck area, allowing, on the other hand, for a quick approaching motion and safe positioning of the camera in front of the eye. Specifically, this makes it possible to take pictures quickly such as, for example, in dynamic context situations like sports and wildlife photography, as well as snap shots.

A system as shown therein has proved itself useful in practice. However, there are situations in which further paraphernalia or items must be carried aside from the camera, and that are also suspended from carrying straps routed over the shoulder. Such items include, for example, hand bags, photo bags and the like. But in these instances it is difficult or not possible at all to route, in addition to the carrying strap for the hand bag, photo bag or any other such items, another separate carrying strap for the camera over the shoulder of the wearer. Wearers consider such a solution cumbersome and impractical. Typically, wearers resort in such instances to the "classic" camera-carrying strap that is placed around the neck with the camera suspended in front of the chest. This ultimately results in the previously indicated disadvantages experienced primarily in connection with heavy camera equipment such as, for example, single-lens reflex cameras with photographic lenses having a large focal length.

DESCRIPTION OF THE INVENTION

The object of the invention is to remedy this disadvantage by seeking and finding an option that will provide the same carrying comfort and utility as described for the camera carrying strap that is disclosed in WO2008/131,135 A1 for situations in which the camera user is already carrying other items by means of carrying straps and without the need of having to employ an additional carrying strap.

This object is achieved by a device for detachably fastening a camera to a carrying strap, preferably a carrying strap that must be carried crossways over the shoulder having an eyelet piece with at least one eyelet for connecting to the carrying strap, a flexible extension fixed to the eyelet piece and a fastening element disposed on one end of the flexible extension and configured as a screw to be screwed in a stand screw bushing of the camera, and wherein the at least one eyelet includes on its peripheral rim a thread-though opening through which the carrying strap is threaded into the eyelet and that is either lockable or dimensioned as sufficiently small that the carrying strap, which is threaded in the at least one eyelet from the side, does not unintentionally escape from the at least one eyelet though the thread-through opening.

The device according to the invention is characterized by the three essential elements of an eyelet piece having an eyelet, a flexible extension fixed to the eyelet piece as well as a fastening element configured as a stand screw to be fixed to the camera, and said being element being disposed on an end of the flexible extension facing away from the eyelet piece. The special feature of the eyelet of the eyelet piece is that it has an opening in the peripheral rim thereof through which a carrying strap such as, for example, the carrying strap of a hand bag or camera bag can be threaded and that is either designed as lockable or dimensioned as so small that the carrying strap does not unintentionally slip out of this thread-through opening.

A device configured in such a way can easily be connected with the carrying strap of another item that is to be carried (or in general with a carrying strap) and has a secure fit so that it does not easily, in particular unintentionally, become detached. Via the eyelet through which the carrying strap is threaded, the device is overall displaceable in a longitudinal direction of the carrying strap and is movable by a gliding motion, similarly to the carrying system for the camera connection as described in WO 2008/131135 A1, along the carrying strap.

The flexible extension that is disposed, on the one hand, on the eyelet piece and, on the other hand, on the fastening element, ensures that upon grasping the camera from the carrying position and lifting it in front of the face there remains sufficient freedom of movement and range of motion to achieve a safe positioning of the camera; because if another item such as a hand bag, photo bag or the like is hanging by its weight on the carrying strap, the carrying strap will not follow an upward movement of the camera but will remain in a more or less tensioned state in its alignment across chest and back. Therefore, only by a flexible extension as provided by the invention is it possible to bridge the last end distance between the carrying strap in its position in which the eyelet comes to a halt after the lifting motion of the camera and the area in front of the face where the camera is being held.

The eyelet advantageously includes a straight and rigid section that is arranged such that, when the carrying strap is inserted, it comes to lie between the carrying strap and the wearer during the carrying action. Advantageously, the straight section includes on each of its two ends a curved section creating a flat bowl. The curved sections therein advantageously extend at their ends parallel relative to each other and vertically relative to the straight section. A section of this kind improves the gliding capability of the eyelet over carrying strap. It is also advantageous for the entire peripheral rim to be executed as rigid. The eyelet can be completed by further rigid or flexible sections. The thread-through opening, for example, can be implemented at the connection site of different eyelet sections in such a way that one end of each of two adjacent sections, is configured as detachable from one another.

The eyelet can, as indicated above, include a simple and unlocked opening, provided said opening is sufficiently small to prevent any unintentional slipping of the carrying strap out of the eyelet. In such a case the width of the opening of the eyelet will be such that it corresponds essentially to the dimensions of a strap having a clearly greater width than thickness of the carrying strap, thus allowing said strap to be threaded into the eyelet by its narrow edge first after it was placed in front of the opening in the eyelet by its wide side and can no longer slip out of the opening. It must be ensured therein that the material of the eyelet is sufficiently stable and that, in particular when carrying the weight of the camera that is fastened to the device, the material of the eyelet will not become deformed and the opening of the eyelet will not be spread open; this would constitute an unintentional risk of the device slipping from the carrying strap and may result in dropping the valuable camera.

Advantageously, the thread-through opening for the lateral threading of the carrying strap is disposed inside the eyelet. This allows for especially easy threading action. Disposing the thread-through opening on the side facing away from of the wearer during the carrying action especially provides security for preventing any unintentional slipping of the strap out of the eyelet.

Such eyelets are safer, and therefore to be preferred, that include securely lockable openings. A closure of this kind can be, for example, configured in the way of a snap and/or snap hook having an articulated locking bar that safely engages when positioned in its locked position with the stationary region of the eyelet frame and/or the rim thereof. A snap of this kind should preferably open to the inside of the eyelet because thereby, when the carrying strap is threaded into the eyelet and the weight of the camera makes contact with the device, it additionally pulls the snap into the locked position.

A further, very reliable option for obtaining safe locking action of the thread-through opening includes providing a sliding sleeve that glides to one of the adjacent sections of the eyelet rim to unlock the thread-through opening and that glides over the opening for locking the same and can thus be connected with the second adjacent section of the eyelet rim. Especially expedient in this context is a screwed connection, and wherein the sliding eyelet is provided with at least one inside thread, and with the mated outside thread being located on the section of the eyelet that is adjacent to the opening, to which the sliding sleeve can be connected in the locked position by means of the screwed connection.

In the alternative or in addition, it is possible to apply a spring load to the sliding sleeve designed such that when at rest it locks the thread-through opening.

A key ring design of the eyelet is also possible that provides open ends located one on top of the other and held in a narrowly contacting locking position by means of spring tension; for opening, they can be spread apart.

It is advantageous for such safety elements protecting the thread-through opening to be disposed, together with the thread-through opening, outside of the section with the peripheral rim, which comes to lie between the wearer and the belt when the carrying strap is threaded through the opening and applied. This facilitates the sliding action of the eyelet over the carrying strap making is more comfortable for the wearer. Any catching of the thread-through opening and/or the safety element on clothes is also less probable with such an arrangement.

The eyelet can basically have any shape such as, for example, round, oval or generally three- or multiple-cornered shapes; but preferably it has an essentially rectangular shape. Having this shape, the eyelet optimally adjusts itself to flat carrying straps across which it can then glide comparatively resistance-free during use. A further preferred shape is a configuration in which the peripheral rim has a stirrup-type shape, meaning with one straight section that is followed on both ends by a curved section. The straight section therein comes to lie between the carrying strap and the wearer, and the flexible extension is disposed opposite from the straight section. Advantageously, such an eyelet is mirror-symmetrical relative to a straight line vertical to the straight section.

The flexible extension is advantageously a band or a strap that may consist of a textile material, leather, imitation leather, plastic or metal, also precious metal, made of metal segments that are movable relative to each other, which can also be precious metal segments and/or plastic segments. The strap and/or band can, in particular, also be elastic. Expedient lengths for the flexible extension comprise lengths between 8 cm and 20 cm, in particular between 10 cm and 15 cm. To be able to make adjustments to the respectively prevalent conditions such as, for example, the type of the carrying strap and/or the bag or other paraphernalia attached to the carrying strap, it is advantageous if the flexible extension includes a means for adjusting its length. Depending on the cut of the carrying strap and the adjusted length of the same, different lengths of the extension may prove expedient and/or ideal for a given situation.

Handling of the device according to the invention is simplified if a pivot joint is disposed between the eyelet piece and the extension. Such a pivot joint is able to execute rotational movements of the flexible extension around its longitudinal axis without twisting the flexible extension.

In the Alternative or in addition, it is possible to dispose such a pivot joint also as part of the connection between the extension and the fastening element.

Finally, especially advantageously, the fastening element is a screw that is screwed in the stand screw bushing on the camera. This type of fastening element has two advantages:

On the one hand, the screwed connection that is to be established with the camera in this manner is an especially safe connection, whereby any unintentional detachment of the camera from the device according to the invention can be precluded. On the other hand, the stand screw bushing is typically located on the bottom side of the camera, meaning when being transported, the camera is transported hanging upside down, usually along the side of the body of the wearer, and it is merely grasped in a pivoting motion and rotated 180° when taken into use and brought in front of the face of the wearer into the "shooting position."

In particular, if the fastening element is, as aforementioned, a screw that is to be screwed into the stand screw bushing of a camera, a pivot joint between the extension and the fastening element is advantageous because the screw can be screwed into the stand screw bushing on the camera without twisting of the extension. This will also prevent any unintentional unscrewing due to the movement of the camera or the flexible extension. While walking, such movements are unavoidable. Usually they induce pendulum motions of the camera that can be reduced by means of such a pivot joint. The rotational element therein can be a ball bearing.

A pivot joint, specifically a ball bearing, can be disposed, in particular, between a screw head and a threaded section of a screw in such a way that its axis of rotation corresponds to the axis of rotation of the threaded section. Advantageously, the screw includes a press-on plate between pivot joint and thread section, in particular a round or disc-shaped press-on plate, that is fixedly connected with the screw and serves as press-on area on the camera during the screw-in action of the screw. Any such press-on plate ensures that the press-on force does not act upon the pivot joint. Moreover, the described configuration of press-on plate, pivot joint and screw head allows for a simple operation of the screw head. Furthermore, a flexible intermediate layer such as, for example, a rubber disc, can be disposed in such a way that said rubber disc comes to lie between the press-on plate and the camera in the screwed-in state of the screw.

It is possible to dispose a fastening means for the flexible element on the outer structural part of the pivot joint and/or an external ring of the ball bearing. The fastening means can be constituted by a bar, in particular a bar that can pivot around the fastening points of the bar on the external ring. The bar therein is advantageously fastened to two points that are arranged diametrically opposed relative to each other, and the bar is configured in such way that it is capable of swinging back and forth over the screw head. This provides for an easy possibility of operating the screw head and placement of the camera on the screw head that is advantageously configured having a flat design.

Furthermore, the flexible element can include a dampening element, in particular a shock absorber. This prevents the transfer of shocks to the camera via the flexible element and is able to reduce any wobbling of the camera by dampening any walking-induced movements.

Several eyelet pieces, in particular two eyelet pieces, can be disposed for securing the carrying strap in the eyelet that are connected to the flexible element, in particular on one end of the flexible element. The thread-through openings of the eyelet therein are disposed such that the carrying strap must be inserted from two different, in particular opposing directions, specifically from two sides, into the eyelet. It is advantageous to dispose the eyelet pieces on the flexible extension in such a way that they come to lie on top of each other and/or next to each other once the carrying strap is completely threaded in. Advantageously, the thread-through openings are disposed in the peripheral rims in such a way that they are not covered. Advantageously, they are located apart from each other as far as possible, in particular on different sides of the eyelet.

Regarding two eyelet pieces, they can be fastened jointly, for example on a loop of the flexible extension and configured in such a way that, with the exception of the area of the thread-through opening with the carrying straps threaded in, they are located congruently adjoining each other.

With such a configuration that provides for several eyelet pieces it is possible to prevent that the carrying strap, even with a movement that is suited to unthread it from an eyelet in the device, will come undone from the device, typically remaining in the device, in fact, even in all eyelets since the further eyelets prevent the unthreading action. This is especially advantageous for eyelets with thread-though openings without safety elements.

To thread the strap in, it is threaded through all the eyelets, if necessary bending it through all thread-through openings. To this end, it is possible to dispose the eyelet pieces in such a way that they can be moved from an advantageous position adjacent to each other into a position in which they are no longer adjacent. This allows for a threading action without excessive bending of the carrying strap.

When using two eyelet pieces it is advantageous to use two identical eyelet pieces that are connected to the flexible extension in such a way that they are disposed mirror-inverted relative to each other.

BRIEF DESCRIPTION OF THE DRAWINGS

Further advantages and characteristics of the invention can be derived from the following description of an embodiment on the basis of the enclosed figures. Shown are as follows:

FIGS. 5a,b show one embodiment each of a device according to the invention for detachably fastening a camera to a carrying strap with a locked snap-type thread-through opening, seen in a schematic depiction.

WAY(S) TO IMPLEMENT THE INVENTION

The figures are highly schematic and in no way intended as embodiments drawn to scale for a device according to the invention for detachably fastening a camera to a carrying strap.

As their essential components and/or assemblies, the devices comprise an eyelet piece 1, a flexible extension 2 and a fastening element 3 for fixing a fastening means of the camera.

The eyelet piece 1 includes an eyelet 4 that has a thread-though opening 5 located in its rim.

Figure 1:
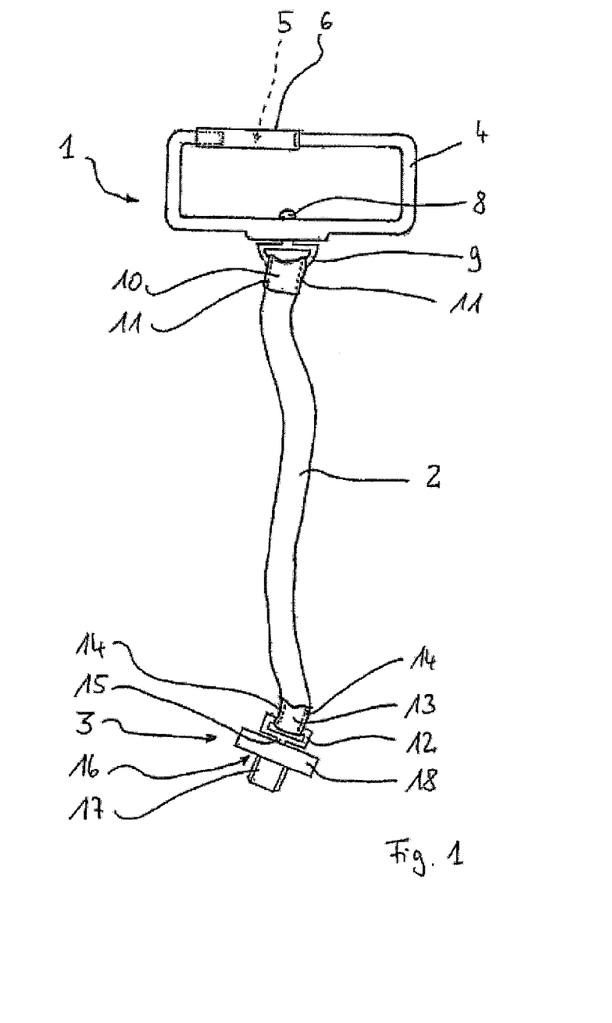
FIG. 1 is an embodiment of a device according to the invention for detachably fastening a camera to a carrying strap with a locked thread-through opening, seen in a schematic depiction.

In FIG. 1 the eyelet 4 has a rectangular peripheral rim and the thread-through opening 5 is locked by a sliding sleeve 6.

Figure 2:
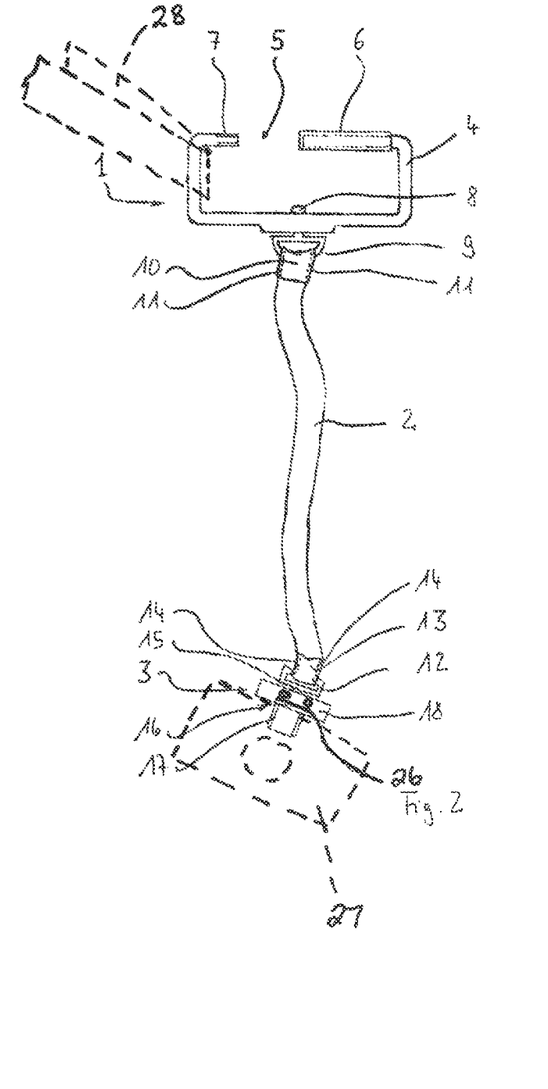
FIG. 2 is the device from FIG. 1 with an unlocked thread-through opening, also seen in a schematic depiction.

In the unlocked state of the thread-through opening 5 (see FIG. 2) the sliding sleeve 6 is pushed on a part of the rim of the eyelet 4 as shown on the right in the Figure. The section of the rim of eyelet 4 along the thread-through opening 5 that is located across from the displaced sliding sleeve 6 has an external thread 7 on a free end that is configured as corresponding to the internal thread (not shown here) on the left side in the Figure of the section of sliding sleeve 6; both threads can be brought to engage in each other. To lock the thread-through opening 5 it is possible for the sliding sleeve 6 to be brought from the position as shown in FIG. 2 into the position as shown in FIG. 1; to this end, it is first moved in the longitudinal direction and then brought into engagement by screwing the same onto the external thread 7.

A stop eyelet 9 is defined on the eyelet 4 by means of peg 8 with the ability to rotate in the longitudinal direction of the same; said stop eyelet is a further component of the eyelet piece 1. A first end of the flexible extension 2 is routed through this stop eyelet 9, folded over in a section 10 and fastened to the rest of the flexible extension 2. The flexible extension 2 herein is a textile band, and wherein the fold-over section 10 is sewed together by means of the seams 11 with the textile band located below it, and the flexible extension 2 is thus fixed to the stop eyelet 9.

The fastening element 3 also includes a stop eyelet 12 through which a section 13 of the strap that constitutes the flexible extension 2 is routed and folded over. By means of seams 14, section 13 is also sewed together with the band of the flexible extension 2 that is located underneath and thus fastened. In an articulated way, the stop eyelet 12 is connected with a screw piece 16 by means of the peg 15, presently not shown in further detail, thus allowing the screw piece 16 to rotate freely around its longitudinal axis relative to the stop eyelet 12.

The screw piece 16 includes a threaded section 17 the external dimensions of which as well as the threads of which correspond to those of a standard tripod screw whereby said section can be screwed into a stand screw bushing of the camera. A handle section 18 is formed to the rear of the threaded section 17 having a circular outside cross section that can feature on its outside surface grooves or something similar to reinforce the structural make-up of the grip area (presently not shown in further detail). By grasping and rotating the handle section 18 it is possible to screw the threaded section 17 of the screw piece 16 into the stand screw bushing and thus connect the device overall with the camera 27 (shown in phantom in FIG. 2). In particular, if the fastening element 3 is, as aforementioned, a screw piece 16 that is to be screwed into the stand screw bushing of the camera 27, a pivot joint between the extension 2 and the fastening element 3 is advantageous because the screw piece 16 can be screwed into the stand screw bushing on the camera without twisting of the extension 2. This will also prevent any unintentional unscrewing due to the movement of the camera or the flexible extension 2. While walking, such movements are unavoidable. Usually they induce pendulum motions of the camera that can be reduced by means of such a pivot joint. The rotational element therein can be a ball bearing 26 (FIG. 2).

It becomes clear now that the device as represented in FIGS. 1 and 2 in a special embodiment can be taken along easily via an existing carrying strap such as, for example, on a camera bag, a hand bag, a courier bag, a uniform coupler or something similar, or also via a scarf or a sash that is arranged crossways across the body and to which the device can be fastened. To this end, first the sliding sleeve 6 is moved into the position as shown in FIG. 2 in order to unlock the thread-through opening 5. The carrying strap 28 (shown in phantom in FIG. 2) can now be threaded through the thread-though opening 5 into the inside of the sleeve 4. When the carrying strap 28 is thus arranged on the inside of the sleeve 4, to provide locking action to the thread-through opening 5, the sliding sleeve 6 is moved in the direction of the end provided with the external thread and/or the section of the rim of the eyelet 4 after which step it is screwed by the internal thread, presently not shown in further detail, onto the external thread 7. This creates the safely locked position as shown in FIG. 1 in which the device according to the invention is safely disposed on the carrying strap. If this has not already been done, it is now possible to connect the fastening element 3 to the camera 27 by screwing the threaded section 17 into a stand screw bushing of said camera. The device is now ready for operation: in the resting position it is possible for the wearer to carry the camera, for example, along the side of the body in the area of the bag or where similar paraphernalia are fastened to the carrying strap. If the wearer wants to take a picture with the camera, he/she can grasp the camera, guide it upward in front of the face and use the device. Only the flexible extension 2 and the eyelet piece 1 with the eyelet 4 are guided in a gliding motion over the carrying strap therein and into a position in which the camera is held by the wearer, bridged by the flexible extension 2, "ready to shoot" in front of the wearer's face.

The shown embodiment depicts the eyelet with a thread-through opening 5 that is to be locked by the sliding sleeve 6. For the person skilled in the art it is immediately clear that other types of locking mechanism could be selected as well such as, for example, a mechanism of the type of a snap hook, of the type of a key ring with two overlapping ends or something similar. Also possible is a design with a thread-through opening that is to be configured as so narrow in terms of its opening width that a carrying strap can routed and/or threaded through it only by its own thickness using the narrow edge; but there is nevertheless no subsequent danger that the carrying strap will unintentionally re-exit the inside of the eyelet 4 by thread-through opening.

A possibility for an adjustment of the length of the flexible extension 2 is not represented in the figure, but it is easy to add. This can be achieved using, for example, a buckle-type system of the kind of a belt buckle or a buckle-type closure on a wrist watch. Other commonly used options for the length adjustment of straps can be employed as well.

Figure 3:
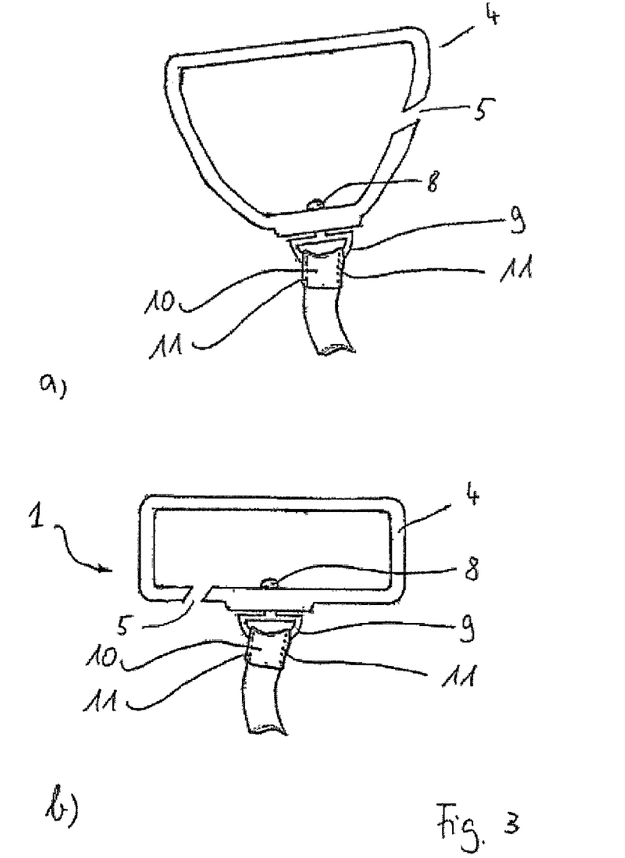
FIG. 3a is an embodiment of a device according to the invention for detachably fastening a camera to a carrying strap with a stirrup-shaped eyelet, seen in a schematic depiction.
FIG. 3b is an embodiment of a device according to the invention for detachably fastening a camera to a carrying strap with a rectangular eyelet, seen in a schematic depiction.

Deviating from FIGS. 1 and 2, FIG. 3a shows a stirrup-type eyelet 4 with unsecured thread-through opening 5 for the lateral insertion of the carrying strap.

FIG. 3b is a section-wise representation of the device from FIG. 2 but with an unsecured thread-through opening 5 that is disposed on the side of the eyelet that is pointed away from the wearer. This allows for utilizing an unsecured thread-through opening with a comparatively high level of security.

The eyelet pieces that are shown in FIGS. 3a and 3b are especially expedient for a device having two eyelet pieces.

Figure 4:
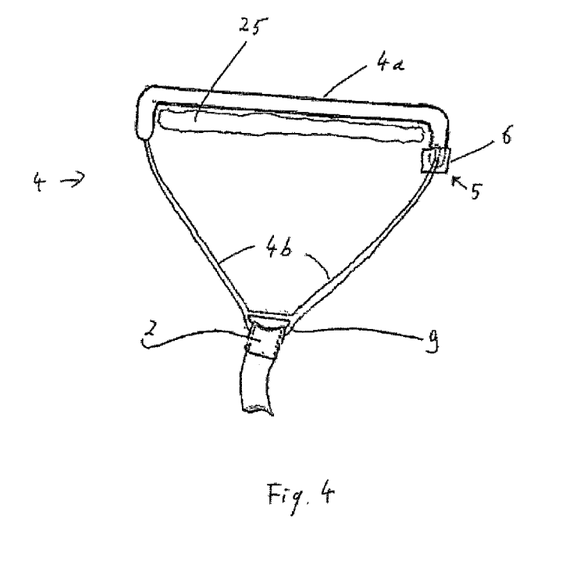
FIG. 4 is an embodiment of a device according to the invention for detachably fastening a camera to the carrying strap with an eyelet having a rigid and a flexible section, seen in a schematic depiction.

FIG. 4 shows a section of a device as in the previous figures; but the eyelet 4 has a straight and rigid section 4a and a flexible section 4b. The flexible section 4b includes a stop eyelet 9 for the connection with the flexible extension 2.

The straight and rigid section 4a includes a curve at each of its ends that support the guided sliding action along the carrying strap 25.

One end of the flexible section 4b is fixedly connected at the end of one of the curves. The other end of the flexible section is detachably fastened to the end of the second curve. To this end, the curve includes an oblong hole that is tapered toward the end of the curve, and the second end of the flexible section can be pulled through the same. The end is provided with a thickened region to prevent any slipping-out of the end from the opening; and a thread and a sliding sleeve 6 with a mated thread are disposed on the second curve by which the second end of the flexible section is clamped during the motion by the sliding sleeve 6. In this manner the second end of the flexible section 4b is unable to unintentionally escape the oblong hole. The connection is detached when the carrying strap is inserted.

Figure 5:
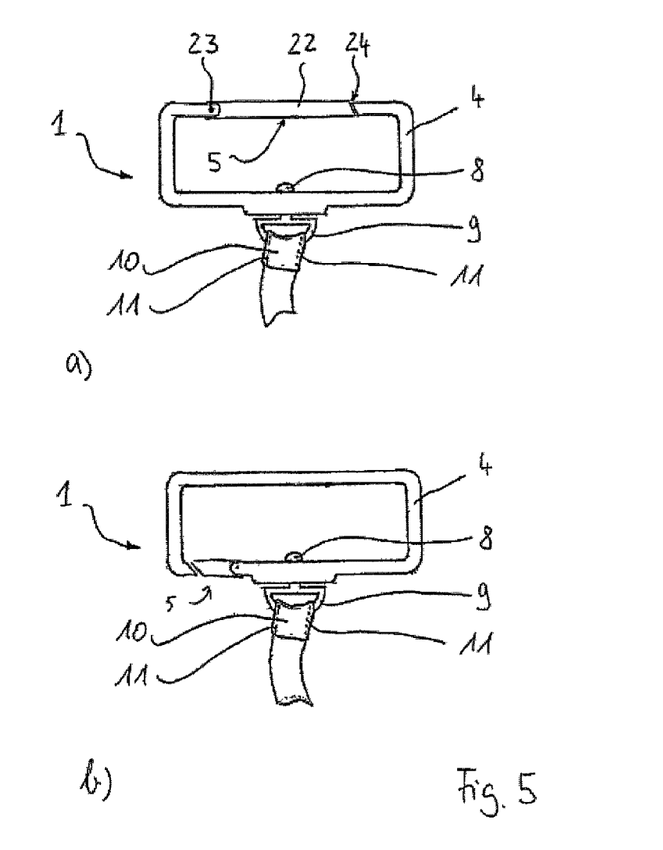

FIG. 5a shows an eyelet in which the closure for the thread-through opening 5 is achieved in the way of a snap hook by a locking bar 22 that is preloaded in its locked position by spring tension. Said snap hook is connected to the fixed frame of the eyelet 4 by means of a joint 23 and can be pivoted to the inside of the eyelet 4 for unlocking the thread-through opening 5. A stop 24 prevents excess pivoting of the locking bar 22.

FIG. 5b shows the configuration of the thread-through opening 5 as in FIG. 5a with a preloaded locking bar 22; but it is disposed on the other side of the eyelet whereby it does not come to lie between the carrying strap and the wearer.

Figure 6:
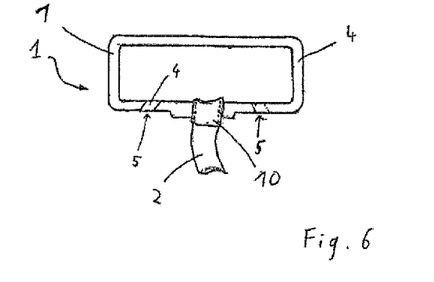
FIG. 6 is an embodiment with two eyelet pieces each having an unsecured thread-through opening.

FIG. 6 shows a section of an embodied example with two eyelet pieces 1 that are adjacent to each other. Since the eyelet pieces 1 are located one on top of the other in the shown view, the lower eyelet piece is only detectable at the location of the thread-through opening 5 of the top eyelet 4. The thread-though opening of the bottom eyelet is pointed to by the perforated line. The eyelet pieces 1 are held by a fold-over section 10 of the flexible extension 2 that is worked into a loop. They are rotatable therein so that they can be separated from each other in order to thread the carrying strap sequentially into the two eyelets 4.

The preceding description demonstrates once more the advantages that the device according to the invention will provide allowing for a high level of flexibility by utilizing an existing carrying strap that is already in use in a different context such as, for example, as a camera bag, a hand bag or something similar.

LIST OF REFERENCE SIGNS 1 eyelet piece
2 flexible extension
3 fastening element
4 eyelet
4a rigid eyelet section
4b flexible eyelet section
5 thread-through opening
6 sliding sleeve
7 external thread
8 peg
9 stop eyelet
10 fold-over section
11 seam
12 stop eyelet
13 fold-over section
14 seam
15 peg
16 screw piece
17 thread piece
18 handle section
22 locking bar
23 joint
24 stop
25 carrying strap

The invention claimed is:

1. A device for detachably fastening a camera to a carrying strap, said device including:
    two eyelet pieces, each having one eyelet adapted to connect to the carrying strap and for the gliding displacement on the same;
    a flexible extension fixed to the two eyelet pieces; and
    a fastening element that is disposed on one end of the flexible extension pointing away from the two eyelet pieces and configured as a screw to be screwed in a stand screw bushing of the camera; and
    wherein each eyelet includes on its peripheral rim a thread-though opening which is adapted to threadably receive the carrying strap therethrough and into the eyelet and that is either lockable or dimensioned as sufficiently small enough that the carrying strap, after being threaded in the eyelet laterally from the side, does not unintentionally escape from the eyelet though the thread-through opening; and wherein the thread-through openings of the two eyelets are disposed in such a way that the carrying strap has to be moved in two different directions to be dethreaded from the two eyelet pieces.

2. The device according to claim 1 wherein the thread-through opening for laterally threading in the carrying strap is defined in the eyelet.

3. The device according to claim 1 wherein the peripheral rim is rigid.

4. The device according to claim 1 wherein the eyelet has an essentially rectangular shape.

5. The device according to claim 1 wherein the flexible extension is a band or a strap.

6. The device according to claim 5 wherein the band or strap is made of one of the following materials: textile material, leather, imitation leather, plastic, or metal.

7. The device according to claim 5 wherein the band or strap is elastic.

8. The device according to claim 1 wherein the flexible extension has a length of between 5 cm and 35 cm.

9. The device according to claim 8 wherein the flexible extension includes a means for the adjustment of its length.

10. The device according to claim 8 wherein the flexible extension has a length of between 10 cm and 15 cm.

11. The device according to claim 1 further comprising a pivot joint in the connection between the flexible extension and the fastening element.

12. The device according to claim 1 wherein a pivot joint is disposed between the screw and the flexible extension in such a way that free twisting of the flexible extension relative to the screw is possible.

13. The device according to claim 12 wherein the pivot joint is a ball bearing.

14. The device according to claim 1, wherein the two eyelet pieces are located adjacent to each other when the carrying strap is threaded in.

15. The device according to claim 1, wherein the thread-through openings on the two eyelet pieces are located in different positions on the eyelet pieces relative to each other.

16. The device according to claim 15, wherein the thread-through openings in the two eyelet pieces are not coincident when the two eyelet pieces are disposed one on top of the other.

17. The device according to claim 1, wherein the two eyelet pieces are secured to each other by a section of the flexible extension; and wherein the two eyelet pieces are rotatable toward and away from each other about the section of the flexible extension.

18. In combination:
    a carrying strap adapted to be secured to an article and worn around a part of a user's body;
    a camera; and
    a device for detachably fastening the camera to the carrying strap, wherein said device comprises;
        two eyelet pieces, each having one eyelet adapted to connect to the carrying strap and for the gliding displacement on the same;
        a flexible extension fixed to the two eyelet pieces; and
        a fastening element that is disposed on one end of the flexible extension pointing away from the two eyelet pieces and configured as a screw to be screwed in a stand screw bushing of the camera; and
    wherein each eyelet includes on its peripheral rim a thread-though opening through which the carrying strap is threaded into the eyelet and that is either lockable or dimensioned as sufficiently small enough that the carrying strap, which is threaded in the eyelet laterally from the side, does not unintentionally escape from the eyelet though the thread-through opening; and wherein the thread-through openings of the two eyelets are disposed in such a way that the carrying strap has to be moved in two different directions to be dethreaded from the two eyelet pieces.

19. The combination according to claim 18, wherein the thread-through openings on the two eyelet pieces are located in different positions on the eyelet pieces relative to each other.

20. The combination according to claim 19 wherein the thread-through openings in the two eyelet pieces are not coincident when the two eyelet pieces are disposed one on top of the other.

21. The combination according to claim 18, wherein the two eyelet pieces are secured to each other by a section of the flexible extension; and wherein the two eyelet pieces are rotatable toward and away from each other about the section of the flexible extension.

22. The combination as defined in claim 18, wherein the two eyelet pieces are secured together by a section of the flexible extension and are rotatable about the section of the flexible extension between a first position where the two eyelet pieces are disposed one on top of the other; to a second position where the two eyelet pieces are separated from each other; and wherein the flexible extension remains engaged with the two eyelet pieces when the eyelet pieces are in both of the first and second positions; and the carrying strap is threaded into the thread-through openings and dethreaded therefrom when the eyelet pieces are separated from each other.

\* \* \* \* \*